R. EMERSON.
HARVESTER.
No. 179,287.  Patented June 27, 1876.
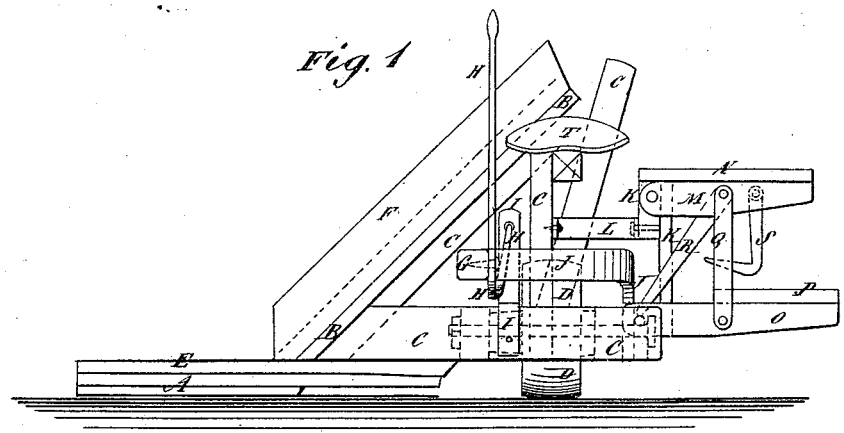
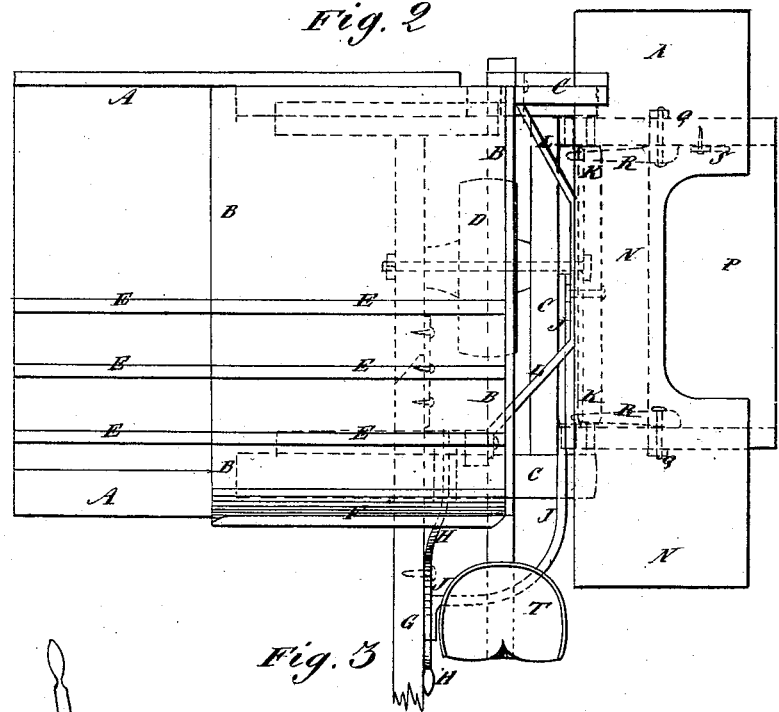
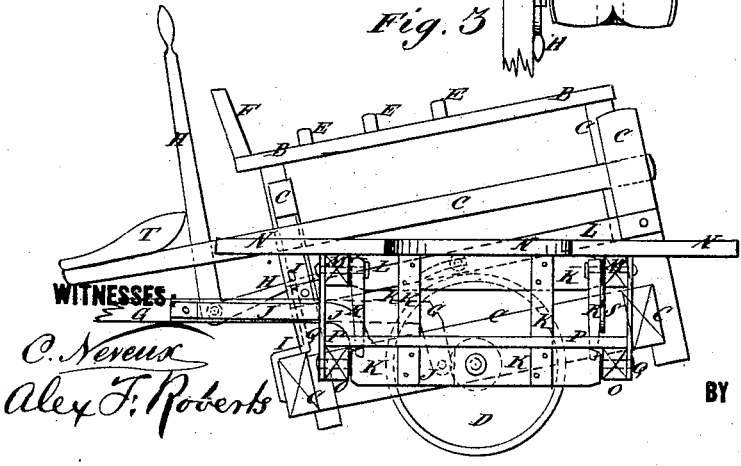
WITNESSES:
O. Neveux
Alex F. Roberts
INVENTOR:
R. Emerson
BY
[signature]
ATTORNEYS.
N. PETERS, PHOTO-LITHOGRAPHER, WASHINGTON, D. C.

UNITED STATES PATENT OFFICE.

RICHARD EMERSON, OF SYCAMORE, ILLINOIS, ASSIGNOR TO HIMSELF AND HORATIO H. MASON, OF SAME PLACE.

IMPROVEMENT IN HARVESTERS.

Specification forming part of Letters Patent No. 179,287, dated June 27, 1876; application filed October 16, 1875.

*To all whom it may concern:*

Be it known that I, RICHARD EMERSON, of Sycamore, in the county of De Kalb and State of Illinois, have invented a new and useful Improvement in Harvesters, of which the following is a specification:

Figure 1 is a front view of a part of my improved harvester. Fig. 2 is a top view of the same. Fig. 3 is an end view of the same.

Similar letters of reference indicate corresponding parts.

The invention is an improvement in the class of harvesters having a binders' table and tilting platform, and a traveling rake arranged to carry the cut grain up to the binders' table. The construction and arrangement of the parts composing the machine are as follows:

A represents the platform of the harvester. B is the inclined plane or platform up which the cut grain is carried by the rake or rakes, and which is supported by the frame-work C, to which is pivoted the drive-wheel D, and with which is connected the binders' table and platform. E are transverse ribs, attached to the platform A, and to the incline B, for the cut grain to rest upon, and between which the rake-teeth pass, so that all the cut grain may be taken and carried up by the rake or rakes. To the forward edge of the incline B is attached a board, F, to prevent the cut grain from scattering about while being carried up said platform. G is the tongue, the rear end of which is hinged to the frame C, so that the platform A can be tilted to bring the cutter-bar closer to or farther from the ground, while the said tongue is held stationary by the neck-yoke of the horses. H is a lever, which is pivoted to the tongue G, and the rear arm of which passes through a hole in an upright, I, rigidly attached to the frame C, so that, by operating the lever H, the platform A may be tilted as required. J is a curved brace, the forward end of which is rigidly attached to the tongue G. The rear part of the brace-bar J extends along and is pivoted to the side bar of the frame C, in line with the rear tongue-bolt, and to it is rigidly bolted the lower bar of an upright frame, K. The upper bar of the frame K has a pin or bolt attached to it, which passes through a slot in the middle part of the bar L. The end parts of the bar L are bent inward, and are rigidly attached to the frame C. The bar L thus holds the frame K in an upright position, and at the same time does not interfere with the movement of the frame C as the platform A is tilted. To the ends of the upper bar of the upright frame K are pivoted or hinged the ends of two bars or cleats, M, to which the binders' table N is secured. To the ends of the lower bar of the upright frame K are pivoted or hinged the ends of two bars or cleats, O, to which the binders' platform P is secured. The binders' platform O P is directly beneath the middle part of table M N, the rear middle part of said table M N being cut away, as shown in Fig. 2, to give space for the binders to stand when at work. Q are two connecting-bars, the lower ends of which are pivoted to the bars or cleats O of the binders' platform O P, and their upper ends are pivoted to the cleats M of the binders' table M N, so that the said table and platform may be made to move together when being turned up and down. The table M N and the platform O P are supported, when lowered into a horizontal position, by the bars, braces, or legs R, the upper ends of which are pivoted to the cleats M by the same bolts that pivot the bars Q to said cleats. The lower ends of the braces R are rounded off, to enter holes in the lower bar of the upright frame K. To one of the cleats M is pivoted a hook, S, which, when the table M N and platform O P are turned up, is hooked upon the outer edge of the platform O P, to lock said table and platform in place. T is the driver's seat, which is attached to the projecting end of a bar of the frame C, the driver balancing the binders on axis of drive-wheel.

Having thus described my invention, I claim as new and desire to secure by Letters Patent—

1. The combination of the upright frame K and the braces J L with the harvester-frame C and the tongue G, substantially as herein shown and described.

2. The combination of the hinged binders' table M N with the upright frame K, the braces J L, the frame C, and the tongue G, substantially as herein shown and described.

3. The combination of the hinged binders' platform O P with the upright frame K, the braces J L, the frame C, and the tongue G, substantially as herein shown and described.

4. The combination of the pivoted braces or legs R with the hinged table M N, hinged platform O P, pivoted connecting-bars Q, and upright frame K, substantially as herein shown and described.

5. The combination of upright frame K, the curved brace J, and tongue G, substantially as herein shown.

RICHARD EMERSON.

Witnesses:
W. H. S. BEAVERN,
GEO. S. ROBINSON.